July 27, 1965  F. G. MOESSNER ETAL  3,196,750
AUTOMATIC CONTROL SYSTEM FOR KEY DUPLICATING
MACHINES AND THE LIKE
Filed Jan. 15, 1964  4 Sheets-Sheet 4

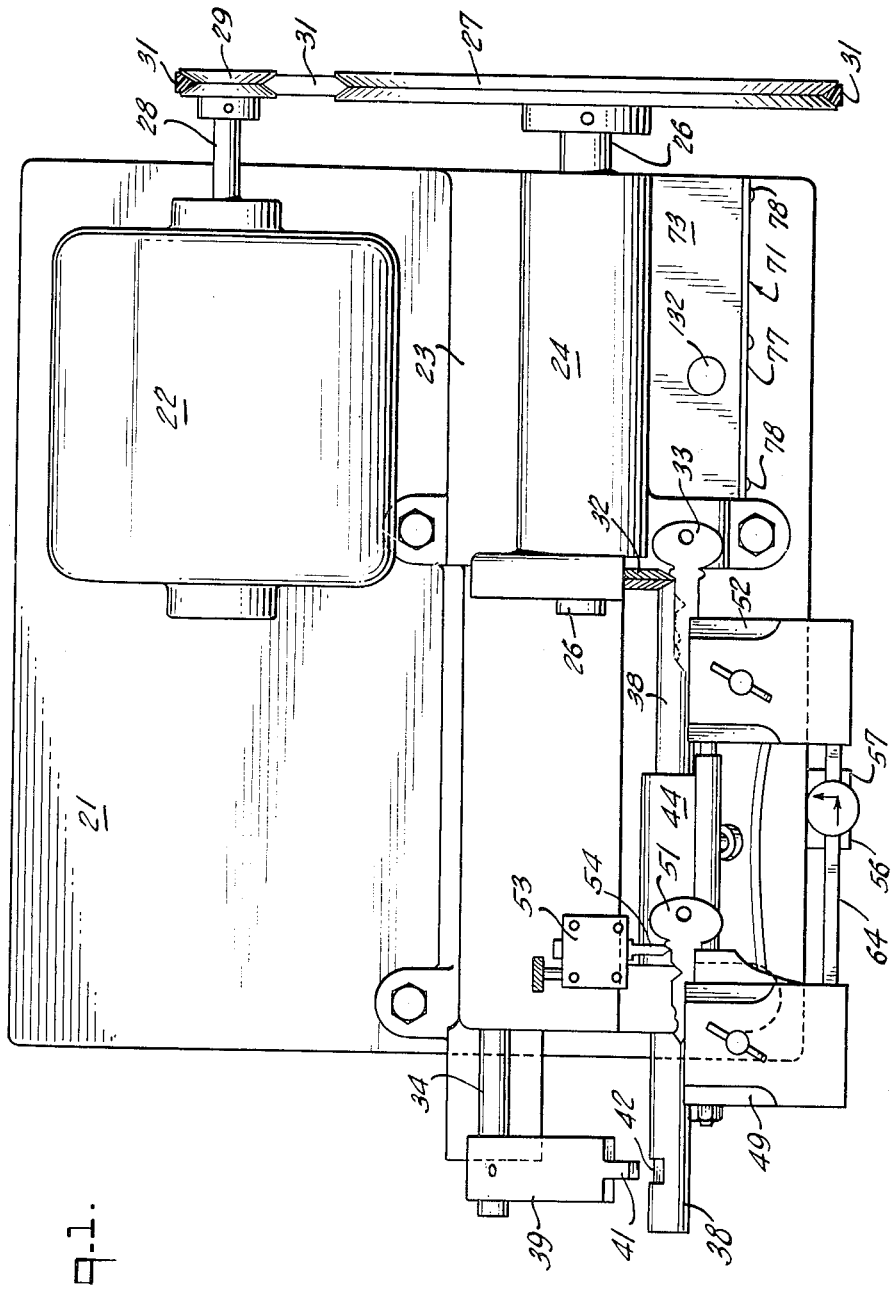

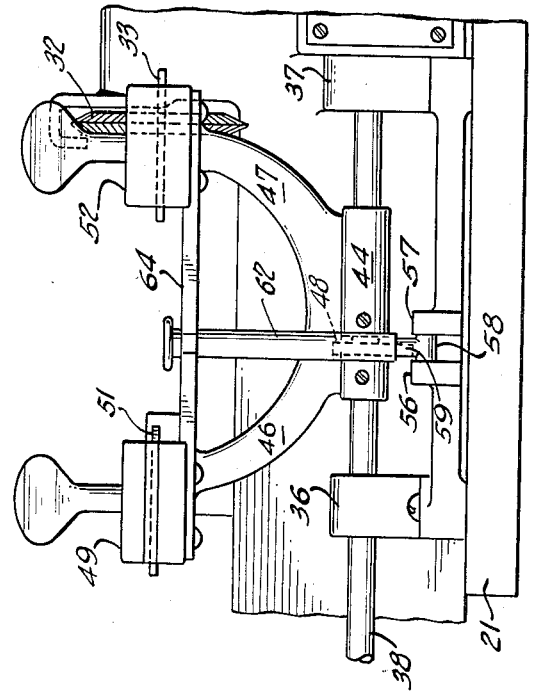
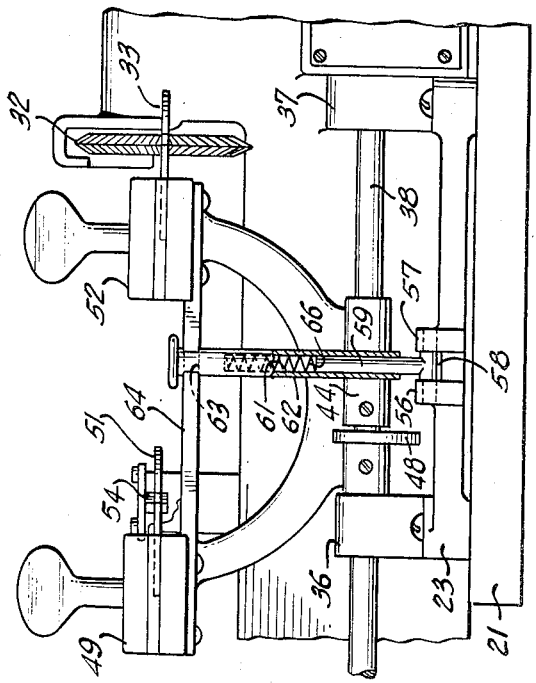

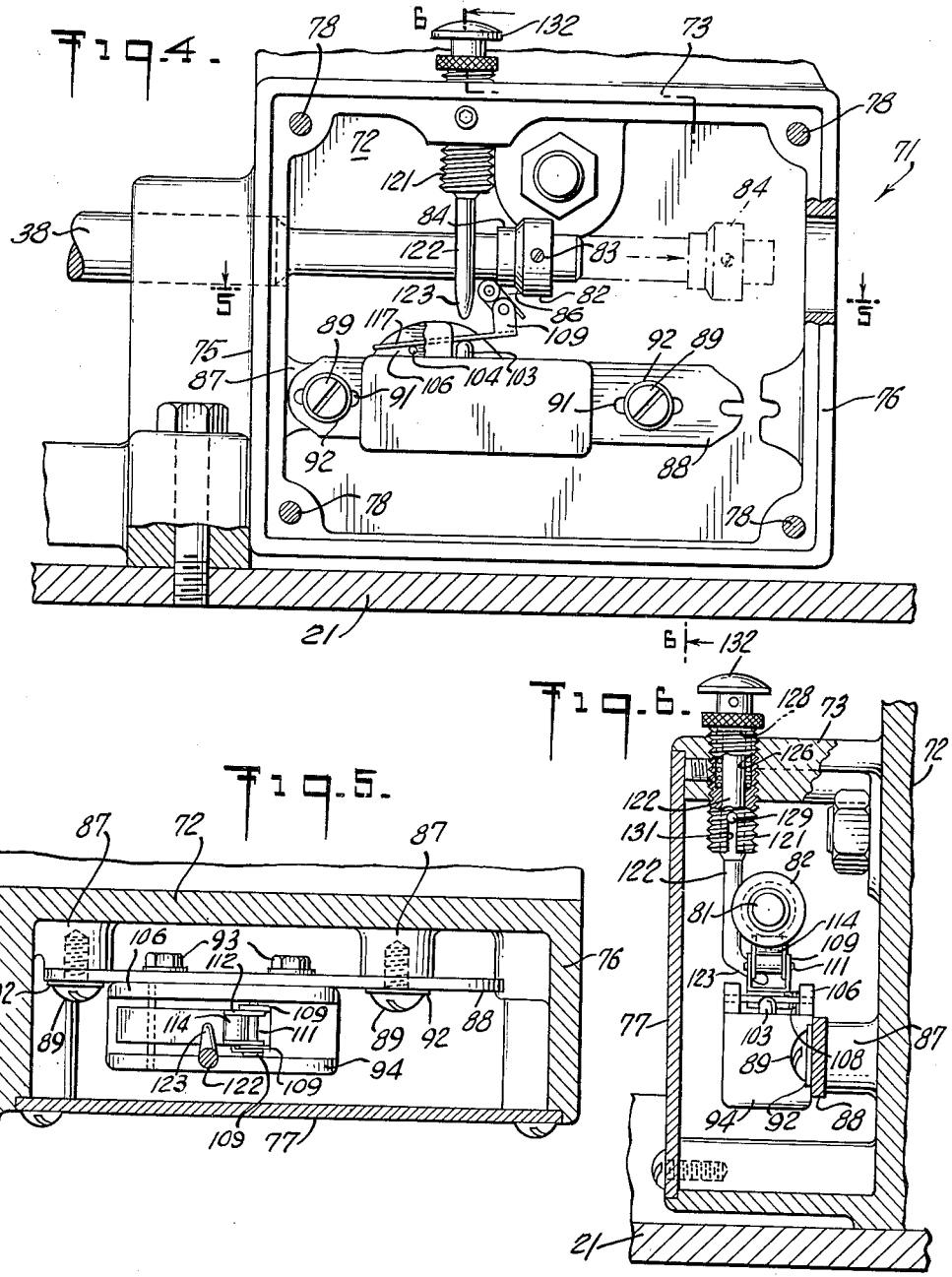

INVENTORS
FRANK G. MOESSNER
ALFRED B. ZION
BY
N. Jordan Funik
ATTORNEY

United States Patent Office 3,196,750
Patented July 27, 1965

3,196,750
AUTOMATIC CONTROL SYSTEM FOR KEY DUPLICATING MACHINES AND THE LIKE
Frank G. Moessner, Dorval, Quebec, and Alfred B. Zion, Montreal, Quebec, Canada, assignors to Dominion Lock Company Ltd., Montreal, Quebec, Canada, a corporation of Canada
Filed Jan. 15, 1964, Ser. No. 337,925
9 Claims. (Cl. 90—13.05)

This invention relates to automatic control systems and particularly to a novel control system for operating the cycling action of the reciprocating carriage of a key cutting machine or the like.

In previous machines of this type, various means for controlling the cycle of the forward and reverse traverse of the key supporting carriage have included multiple latching and linking mechanisms which have been complex in structure and expensive to manufacture. Furthermore, these previous control systems have included some form of manual operation necessary to accompany such control operations.

According to present inventions, means are provided to start and stop the cutting cycle of a key duplicating machine which eliminates a considerable amount of linkages and control mechanisms and obviates the necessity of additional manual operation to complete the key cutting process.

A salient feature of the invention is the provision of a simplified starting and stopping mechanism which comprises a spring biased link on a microswitch actuator which, when said actuator is momentarily tripped, cooperates with the reciprocating carriage shaft and with a cam thereon to close the electric motor energizing circuit to maintain said circuit closed while a forward and reverse key cutting traverse takes place, after which the cam and link cooperate automatically to open the motor circuit to stop the running of the machine.

Still other objects and advantages of the invention will be apparent from the specification.

The features of novelty which are believed to be characteristic of the invention are set forth herein and will best be understood, both as to their fundamental principles and as to their particular embodiments, by reference to the specification and accompanying drawings, in which:

FIGURE 1 is a top view of the key cutting machine of the present invention;

FIGURE 2 is a fragmentary front elevation of a portion of the machine shown in FIGURE 1 with the key carriage shown at the beginning of the cutting cycle;

FIGURE 3 is similar to FIGURE 2, showing the key carriage at the mid-point of the key cutting cycle;

FIGURE 4 is a greatly enlarged fragmentary front elevation of the interior of the control box of the machine shown in FIGURE 1, some parts being in section, some parts being in dotted outline, and some parts being omitted;

FIGURE 5 is a view taken on line 5—5 of FIGURE 4;

FIGURE 6 is a view taken on lin 6—6 of FIGURE 4, some parts being shown in elevation, some parts in dotted outline, and some parts being omitted;

Figure 7:
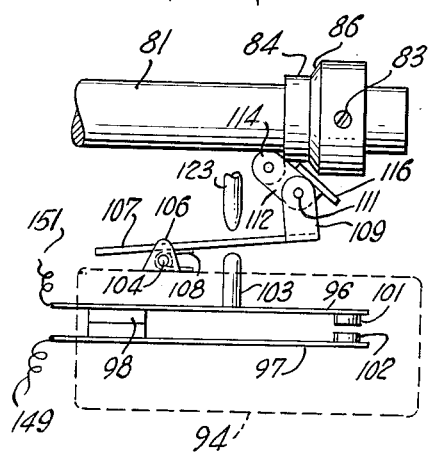
FIGURE 7 is a greatly enlarged fragmentary view, partly in diagrammatic form, showing the control system in one phase of its operation.

Referring now to the drawings and particularly to FIGURE 1, the key machine is mounted on a cast iron base 21 or the like and constitute an electric motor 22 which is energized by a suitable power source not shown. Also mounted on base 21 is a case iron frame 23 which carries most of the mechanism of the key machine. Rotatably mounted on a raised portion 24 of frame 23 within a suitable pair of spaced apart bearings or the like, not shown, is a cutter shaft 26, upon the right end of which is mounted fast a driven wheel 27. Mounted on the output drive shaft 28 of motor 22 is a drive wheel 29. Both wheels 27 and 29 have peripheral grooves which accommodate a flexible drive belt 31 whereby the rotation of drive shaft 28 by motor 22 causes the rotation of driven wheel 29 and of cutter shaft 26.

Mounted near the left end of cutter shaft 26 and rotated thereby is a key cutter wheel 32 whose peripheral surface is shaped to cut the tumbler operating profile along the length of a key blank 33. Operationally connected to cutter shaft 26 within frame portion 24 is a gear train and a worm gear takeoff, not shown, but well known in the art, which are coupled to rear shaft 34 to move the latter reciprocably in a path from left to right and vice versa.

Integrally formed in the front portion of frame 23 is a pair of spaced apart bosses 36 and 37 each of which contains a journal bearing which supports a carriage shaft 38 movable longitudinally from right to left and vice versa. See also FIGURES 2 and 3. Rectilinear movement is imparted to carriage shaft 38 by means of link bar 39 pivotally mounted on rear shaft 34, the forward end of link bar 39 having a projection 41 which removably mates with recess 42 in carriage shaft 38.

Slidably mounted on and rotatable relative to carriage shaft 38 is a carriage yoke 44 having a pair of integral upwardly extending spaced apart arms 46 and 47. While yoke 44 is slidable longitudinally upon shaft 38, it may be fixed fast in a suitable location thereon by means of a clutch, not shown, operated by clutch lever 48.

Mounted on the top of arm 46 of carriage yoke 44 is a clamp 49 for removably securing the master key 51 in position. Mounted on the top of arm 47 is a clamp 52 for securing key blank 33 in position. Mounted on frame 23 is an upwardly extending bracket 53 in which is removably secured a forwardly extending cutting guide or key follower 54 the end of which cooperates with the profile of key 51 which moves transversely relative thereto.

Formed integrally in the front portion of frame 21 is a pair of spaced apart bosses 56 and 57 which pivotally support a pivot pin 58 having an integrally formed perpendicularly extending plunger rod 59 which slidably mates with the longitudinal recess 61 of cylindrical control rod 62. The upper end of control rod 62 has a lateral aperture 63 which slidably accommodates guide rod 64 connected horizontally between clamps 49 and 52.

Positioned between the upper end of recess 61 and the upper end of plunger 59 is a compressed coil spring 66 which normally urges control rod 61 upwardly. Since the respective pivot axes of pin 58 and yoke 44 are spaced apart the resultant upward force of rod 61 is translated through rod 64 to cause arms 46 and 47 to be urged pivotally toward the rear of the machine whereby master key 51 is urged against key follower 54 and key blank 33 is urged against cutter 32. Lateral movement of said keys is permitted by rod 64 sliding freely through aperture 63 in rod 62 which cannot move in either lateral direction. Arms 46 and 47 of yoke 44 are yieldable under the action of spring 66 whereby the profile of master key 51 is always maintained in frictional engagement with key follower 54 as said key moves laterally in respect thereof. Thus an equivalent profile is formed by cutter wheel 32 upon key blank 33 by virtue of the identical motions of clamps 49 and 52 on arms 46 and 47, respectively, of yoke 44.

The control system of the key cutting machine is contained within a control box, generally designated 71, located in front of raised portion 24 of frame 23. Box 71 comprises a rear wall 72, top wall 73, bottom wall 74, left hand wall 75 and right hand wall 76. Covering the open front of box is a cover plate 77 removably secured to said box by means of suitable screws 78 or the like.

Left wall 75 has an aperture 79 through which shaft 38 freely moves longitudinally. Shaft 38 has an integral axial extention 81 of somewhat reduced diameter which is located within control box 71. Mounted near the right end of extension 81 is a ring 82 which may be adjustably secured thereon in a suitable location by means of set screw 83 or the like.

Integrally formed on the left side of ring 82 is a cam collar 84 whose outside diameter is coaxial with and somewhat larger than the diameter of extension 81. The outside diameter of ring 82 is somewhat larger than that of collar 84, said ring and said collar being joined by a beveled shoulder 86.

Rear wall 72 of control box has a pair of forwardly extending spaced apart bosses 87 upon which mounting plate 88 is secured by means of screws 89. Plate 88 has a pair of horizontal slots 91, slightly wider than the shanks of screws 89, whereby plate 88 may be adjusted in proper position before said screws are tightened. Washers 92 may be provided for distributing the pressure of the heads of screws 89 upon plate 88 beyond slots 91.

Connected to mounting plate 88 by means of screws 93 is a microswitch 94 in the interior of which is located a pair of spaced apart flexible electrically conductive contact arms 96 and 97. The left end portions of contact arms 96 and 97 are mounted rigidly upon opposite sides of an insulator block 98. Connected to the bottom surface of the free right end of contact arm 96 is a contact button 101, and connected to the upper surface of the free right end of contact arm 97 is a contact button 102, the opposing surfaces of buttons 101 and 102 being normally spaced apart from each other by virtue of the inherent spring bias of arm 96. See FIGURE 7. Mounted on the top and intermediate the ends of contact arm 96 is an actuator rod 103 extending upwardly and freely through a suitable aperture, not shown, in the top of microswitch 94.

Pivotally mounted upon pin 104 of spaced apart brackets 106 on top of microswitch 94 is an actuator lever 107 the right end of said lever being normally urged upwardly by means of spring 108 coiled around pin 104. Mounted on the right end of lever 107 is a pair of upwardly extending spaced apart brackets 109 between which is supported a pivot pin 111. Pivotally mounted on pin 111 is a pair of spaced apart links 112, between the outer end portions of which is supported a pin 113 rotatably carrying a cam roller 114.

Figure 10:
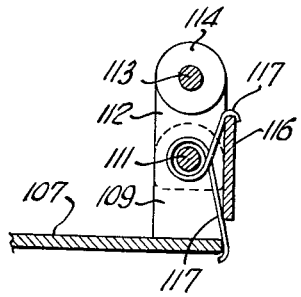
FIGURE 10 is a greatly enlarged view of a fragmentary portion of the cam roller element shown in FIGURES 7, 8 and 9.

Connected across a portion of the right edges of links 112 is a stop plate 116, the lower free end of which extends along a portion of the right edges of brackets 109 against which it is normally urged by spring 117 coiled around pin 111. See FIGURE 10.

Extending vertically through top wall 73 of box 71 is a bushing 121 longitudinally accommodating a plunger 122 that extends into the interior of said box. Plunger 122 has an obliquely extending toe 123, the lower end of which is normally poised above actuator lever 107 in a position where the downward movement of said plunger causes said toe to urge said lever downwardly whereby the latter causes the depression of rod 103 to close contact buttons 101 and 102 with one another.

Coiled around plunger 122 in the interior of bushing 121 is a spring 126, one end of which bears against an annular shoulder 127 in the interior of bushing 121, the other end bearing upon an annular shoulder 128 on plunger 122. Said spring 126 normally urges plunger 122 upwardly to the extent limited by a transverse pin 129 in said plunger abutting the inner end of slot 131 in bushing 121. Plunger 121 has a cap 132 on the exterior of box 71 for manual depressing of said plunger, the latter returning to its normal retracted position under the action of spring 126 when cap 132 is released.

Figure 11:
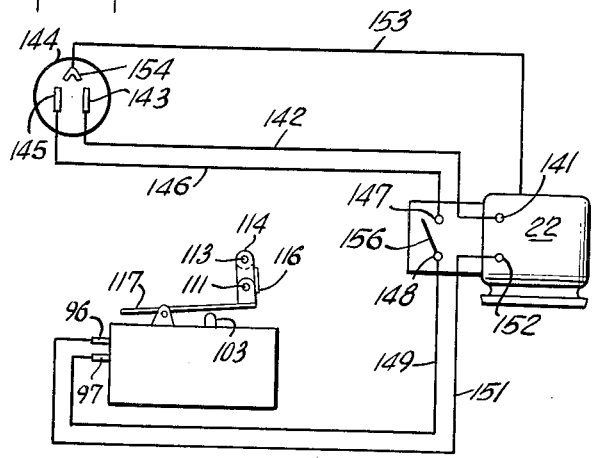
FIGURE 11 is a schematic circuit of the control system of the present invention.

The electrical circuitry of the apparatus herein is illustrated schematically in FIG. 11 where terminal 141 of motor 22 is connected by way of lead line 142 to terminal 143 of a suitable power source 144. The other terminal 145 of said power source is connected by way of lead line 146 to terminal 147 of a master make-or-break switch, the other terminal 148 of which is connected by lead line 149 to contact arm 97 of microswitch 94. Contact arm 96 of said microswitch is connected by way of lead line 151 to the other terminal 152 of motor 22. Motor 22 is grounded by way of lead line 153 to ground terminal 154 of power source 144.

The closing of the master switch by causing its armature 156 to make contact with terminal 147 places the motor circuit in a condition where it is now controlled by microswitch 94. When contact buttons 101 and 102 are spaced apart as in FIGURE 7, motor 22 does not run. When, however, contact buttons 101 and 102 are closed, as shown in FIGURES 8 and 9, motor 22 is energized and produces the rotation of cutter wheel 32 and the reciprocating longitudinal movement of rear shaft 34, carriage shaft 38, and yoke arms 49 and 52 whereby the profile of key blank 33 is cut by wheel 32 as a replica of the profile on master key 51.

In operation, master key 54 and key blank 33 are clamped in position, the master switch is closed by causing armature 156 to contact terminal 147, after which cap 132 of plunger 122 is momentarily depressed and released. This action causes toe 123 of plunger 122 to depress lever 107 which in turn depresses actuator 103 as shown in FIGURE 8, whereby contacts 101 and 102 close the electrical circuit energizing motor 22.

When the apparatus is at rest at the beginning of the cutting cycle, carriage shaft 81 is in the position as shown in FIGURE 7, where the edge of collar 84 impinging upon roller 114 has caused links 112 to be positioned at an angle relative to brackets 109, the latter being normally urged upwardly under action of spring 108 upon lever 107.

Figure 8:
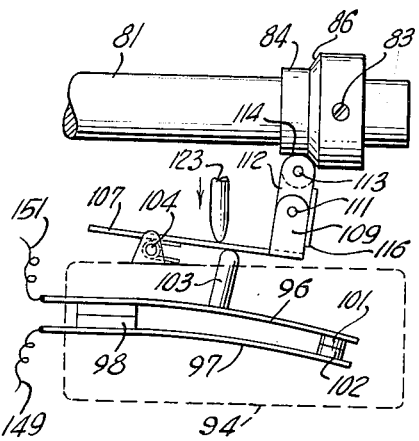
FIGURE 8 is a view similar to FIGURE 5 showing the control system in a second phase of its operation.
Figure 9:
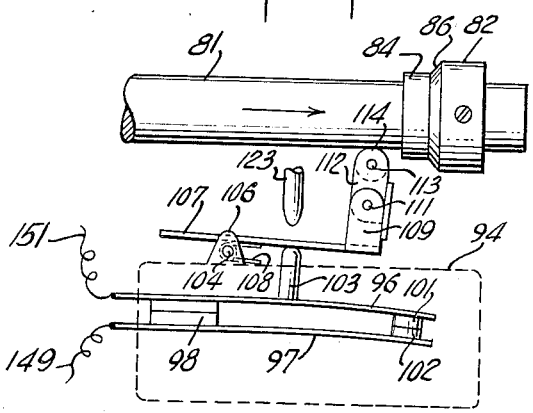
FIGURE 9 is similar to FIGURES 5 and 6 showing the control system in a third phase of its operation.

When plunger 122 is depressed to cause the pivoting action of lever 107, the concomitant retraction of brackets 109 from shaft 81 permits links 112, under the action of spring 117 to move pivotally into extended alignment with said brackets as shown in FIGURE 8, where roller 114 is now urged against shoulder 86 of ring 82 and against the peripheral surface of collar 84. In this position links 112 and brackets 109 in alignment with each other maintain lever 107 in a depressed condition whereby actuator 103 continues to be urged downwardly to hold contacts 101 and 102 in the closed circuit condition as shown in FIGURE 8.

Upon the closing of the motor circuit by contacts 101 and 102, and upon the starting of motor 22, the gear train actuated by said motor causes carriage shaft 81 to move to the right as shown in FIGURE 9. As carriage shaft 81 moves to the right, roller 114 bears against the bottom of said carriage shaft whereby links 112 and brackets 109 continue to maintain lever 107 in a depressed condition to keep contacts 101 and 102 closed.

Carriage shaft 81 continues to move toward the right while cutting wheel 32 cuts a profile in key blank 33 in accordance with the profile of master key 51. At the end of the traverse of shaft 81 to the right as determined by the conventional reciprocating gear train and worm gear arrangement, carriage shaft 81 reverses its direction and moves to the left so that cutter wheel 31 makes a reverse cutting pass at key blank 33. Toward the end of the leftward movement of carriage shaft 81, the leading edge of collar 84 causes roller 114 to move to the left whereby links 112 are pivotally moved obliquely against the action of spring 117 into a deflected position relative to brackets as shown in FIGURE 7. By this action, the previous longitudinal downward pressure through the aligned combination of links 112 and brackets 109 is relieved whereby the right end of lever 107 is caused to move upwardly under the action of spring 108. Thus actuator 103 moves upwardly under the spring tension in contact arm 96 whereby contacts 101 and 102 become spaced apart to open the power circuit to motor 22 which consequently stops running, thereby completing the key cutting cycle.

The beginning and end of the cutting cycle are determined by the location of the edge of collar 84 and in its interaction with roller 114. Ring 82 and its collar 84, being readily movable longitudinally on carriage shaft 81, may be adjusted and secured in a suitable position thereon empirically, depending upon the dimensional characteristics of the other components of the machine, whereby the forward and reverse passes of the cutting cycle may be started and stopped at the proper times. Also the location of roller 114 relative to collar 84 may be determined by adjusting the location of microswitch 94 by moving and securing mounting plate 88 in the desired position.

It is claimed:

1. A system for controlling the cycle of a forward and reverse traverse of a machine element comprising a motor, a power source for said motor, drive means between said motor and said machine element, a normally open switch between said power source and said motor, first means for momentarily closing said switch, second means mounted between said switch and said element and operable when said first means is actuated to maintain said switch in a closed condition during the course of said cycle, and third means on said element operative upon said second means at the end of said cycle to cause said switch to open.

2. A system according to claim 1 wherein said second means is a spring biased pivotable link mounted between said switch and said element, said link being positionable in a deflected condition and an extended condition relative to said element, said switch being open when said link is in the deflected position and said switch being closed when said link is in the extended position.

3. A control system comprising a motor, a power source for said motor, a normally open switch between said motor and said power source, a carriage movable reciprocably by said motor in a forward and reverse traverse, a spring biased actuator on said switch, a spring biased link on said actuator, said link being urged against said carriage by said actuator in both a deflected position and an extended position, said switch being in the open circuit condition when said link is in the deflected position, said switch being in the closed condition when said link is in its extended position.

4. A control system according to claim 3 and further comprising a cam on said carriage, said cam being located in a position where it causes the deflection of said link when a cycle of a forward and reverse traverse of said carriage is completed.

5. A control system according to claim 3 and further comprising a spring biased normally retracted plunger, said plunger being momentarily operable when said switch is open and when said link is in the deflected position to move said actuator into a circuit closing position and to cause said link to assume an extended position relative to said carriage.

6. A control system for a key cutting machine or the like, comprising a motor, a power source for said motor, a carriage movable reciprocably by said motor in a forward and reverse traverse, a normally open switch connected between said motor and said power source, a spring biased actuator on said switch movable from a normally open circuit position into a position for closing said switch, a spring biased pivotable link on said actuator cooperating with said carriage, said actuator being in the open circuit position when said link is in a deflected position against said carriage, said actuator being in a circuit closing position when said link is in an extended condition in relation to said carriage, said link being in an extended condition when said carriage moves in its forward and reverse traverse, and a cam on said carriage, said cam being located in a position where it causes the deflection of said link to release said actuator into its open circuit position when said carriage has completed its reverse traverse.

7. A control system according to claim 6 and further comprising a normally retracted spring biased plunger, said plunger being operable when said switch is open and when said link is in the deflected postiion to be urged momentarily against said actuator to close said switch and to cause said link to assume its extended position against said carriage and to maintain said switch in the closed condition.

8. A control system for a key cutting machine comprising a motor, a carriage shaft moved by said motor in forward and reverse traverse, a normally open switch for connecting said motor to a power source, an actuator on said switch, a spring biased pivotable link on said actuator, a spring on said actuator normally urging said link toward said shaft, a cam on said shaft, said cam being operative to pivotally move said link against the action of its spring into a first position where the actuator is in an open circuit position, the momentary depression of said actuator causing the closing of the switch and causing the pivotal movement of said link under the action of its spring to assume a second position and to bear against another portion of said cam and thereafter to bear continually against said shaft as the latter moves in its forward traverse to maintain said switch in the closed circuit condition, said cam at the end of the reverse traverse of said shaft being operative on said link to return the latter to its first position and to permit the return of said actuator to its open circuit position.

9. A system according to claim 8 wherein said cam is adjustably movable into a fixed location on said shaft to determine the time when said cam is operable upon said link during the traverse of said shaft.

References Cited by the Examiner
UNITED STATES PATENTS 2,645,978   7/53   Sejarto et al. _____ 90—13.05
2,704,964   3/55   Stolove _____ 90—13.05

WILLIAM W. DYER, Jr., *Primary Examiner.*

LEON PEAR, *Examiner.*